United States Patent
Hasegawa et al.

(10) Patent No.: US 12,422,539 B2
(45) Date of Patent: Sep. 23, 2025

(54) POSITION MANAGEMENT SERVER, RADIO COMMUNICATION SYSTEM, CONTROL CIRCUIT, STORAGE MEDIUM, AND MOBILE OBJECT POSITION MANAGING METHOD

(71) Applicant: Mitsubishi Electric Corporation, Tokyo (JP)

(72) Inventors: Fumihiro Hasegawa, Tokyo (JP); Masao Oga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 441 days.

(21) Appl. No.: 17/834,467

(22) Filed: Jun. 7, 2022

(65) Prior Publication Data

US 2022/0299622 A1    Sep. 22, 2022

Related U.S. Application Data

(63) Continuation of application No. PCT/JP2020/009826, filed on Mar. 6, 2020.

(51) Int. Cl.
*G01S 13/46* (2006.01)
*G01S 13/62* (2006.01)

(52) U.S. Cl.
CPC .............. *G01S 13/46* (2013.01); *G01S 13/62* (2013.01)

(58) Field of Classification Search
CPC .................................. G01S 13/46; G01S 13/62
See application file for complete search history.

(56) References Cited

U.S. PATENT DOCUMENTS

| 2008/0137571 A1* | 6/2008 | Suga | H04L 67/12 |
| | | | 370/310 |
| 2012/0172055 A1* | 7/2012 | Edge | G01S 5/0249 |
| | | | 455/456.1 |

(Continued)

FOREIGN PATENT DOCUMENTS

| CN | 1664609 A | * | 9/2005 | ............... G01S 7/00 |
| CN | 112583872 A | * | 3/2021 | ............. H04L 67/12 |

(Continued)

OTHER PUBLICATIONS

"3rd Generation Partnership Project; Technical Specification Group Radio Access Network; NR; Physical layer procedures for data (Release 15)", 3GPP TS 38.214, V15.8.0, Dec. 2019, Total 106 pages.

(Continued)

*Primary Examiner* — Vladimir Magloire
(74) *Attorney, Agent, or Firm* — Birch, Stewart, Kolasch & Birch, LLP

(57) ABSTRACT

A position management server being a first position management server in a radio communication system that includes the first position management server to hold first position information indicating a position of a mobile object measured by a first method, and a second position management server to hold second position information indicating the position of the mobile object measured by a second method, includes: a storage unit that holds the first position information; a communication unit that receives the second position information from the second position management server, and transmits the first position information to the second position management server; and a control unit that generates third position information indicating the position of the mobile object by using the second position informa- (Continued)

tion and the first position information, and causes the third position information to be held in the storage unit.

12 Claims, 11 Drawing Sheets

(56) References Cited

U.S. PATENT DOCUMENTS

| | | |
|---|---|---|
| 2014/0297843 A1 | 10/2014 | Shiga et al. |
| 2016/0095080 A1 | 3/2016 | Khoryaev et al. |
| 2020/0249695 A1* | 8/2020 | Otto ................... G05D 1/0274 |

FOREIGN PATENT DOCUMENTS

| | | | |
|---|---|---|---|
| JP | 2004302951 A | * | 10/2004 |
| JP | 2014-197759 A | | 10/2014 |
| JP | 2018-147094 A | | 9/2018 |

OTHER PUBLICATIONS

International Search Report for PCT/JP2020/009826 mailed on Jul. 7, 2020.
Written Opinion of the International Searching Authority for PCT/JP2020/009826 mailed on Jul. 7, 2020.
Chinese Office Action and Search Report for Chinese Application No. 202080097932.6, dated Dec. 16, 2024, with English translation.
Chinese Office Action and Search Report for Chinese Application No. 202080097932.6, dated Jun. 19, 2025, with English translation.

* cited by examiner

POSITION MANAGEMENT SERVER, RADIO COMMUNICATION SYSTEM, CONTROL CIRCUIT, STORAGE MEDIUM, AND MOBILE OBJECT POSITION MANAGING METHOD

CROSS-REFERENCE TO RELATED APPLICATION

This application is a continuation application of International Application PCT/JP2020/009826, filed on Mar. 6, 2020, and designating the U.S., the entire contents of which are incorporated herein by reference.

BACKGROUND OF THE INVENTION

1. Field of the Invention

The present disclosure relates to a position management server that holds position information of mobile objects, a radio communication system, a control circuit, a storage medium, and a mobile object position managing method.

2. Description of the Related Art

In related art, in a system for measuring the positions of terminals such as mobile objects, a base station or a positional measurement server and a terminal can exchange information on received power information and angles at which signals are received through radio communication to obtain the absolute position of the terminal indicated by the longitude and the latitude, or the like. As defined in the 3rd Generation Partnership Project (3GPP) standards, "Physical layer procedures for data (Release 15)", 3GPP TS 38.214, V 15.8.0, (2019-12) of Non Patent Literature 1 teaches a technology for measuring the position of a terminal by exchanging reference signals between a base station or a positional measurement server and the terminal.

The technology described in the above Non Patent Literature 1, however, has a problem in that, when an obstacle is present between the base station or the positional measurement server and the terminal, received power decreases and accurate position information cannot be obtained. Although there is a method in which terminals measure relative positions of each other to measure the distances to each other, the absolute position of each terminal cannot be obtained by this method.

The present disclosure has been made in view of the above, and an object thereof is to provide a position management server capable of reducing situations in which the positional measurement precision lowers in measuring the position of a mobile object.

SUMMARY OF THE INVENTION

In order to solve the above problem and achieve the object, the present disclosure is a position management server being a first position management server in a radio communication system that includes the first position management server to hold first position information indicating a position of a mobile object measured by a first method, and a second position management server to hold second position information indicating the position of the mobile object measured by a second method. The position management server includes: a storage unit to hold the first position information; a communication unit to receive the second position information from the second position management server, and transmit the first position information to the second position management server; and a control unit to generate third position information indicating the position of the mobile object by using the second position information and the first position information, and cause the third position information to be held in the storage unit.

DETAILED DESCRIPTION OF THE PREFERRED EMBODIMENTS

A position management server, a radio communication system, a control circuit, a storage medium, and a mobile object position managing method according to certain embodiments of the present disclosure will be described in detail below with reference to the drawings.

First Embodiment

Figure 1:
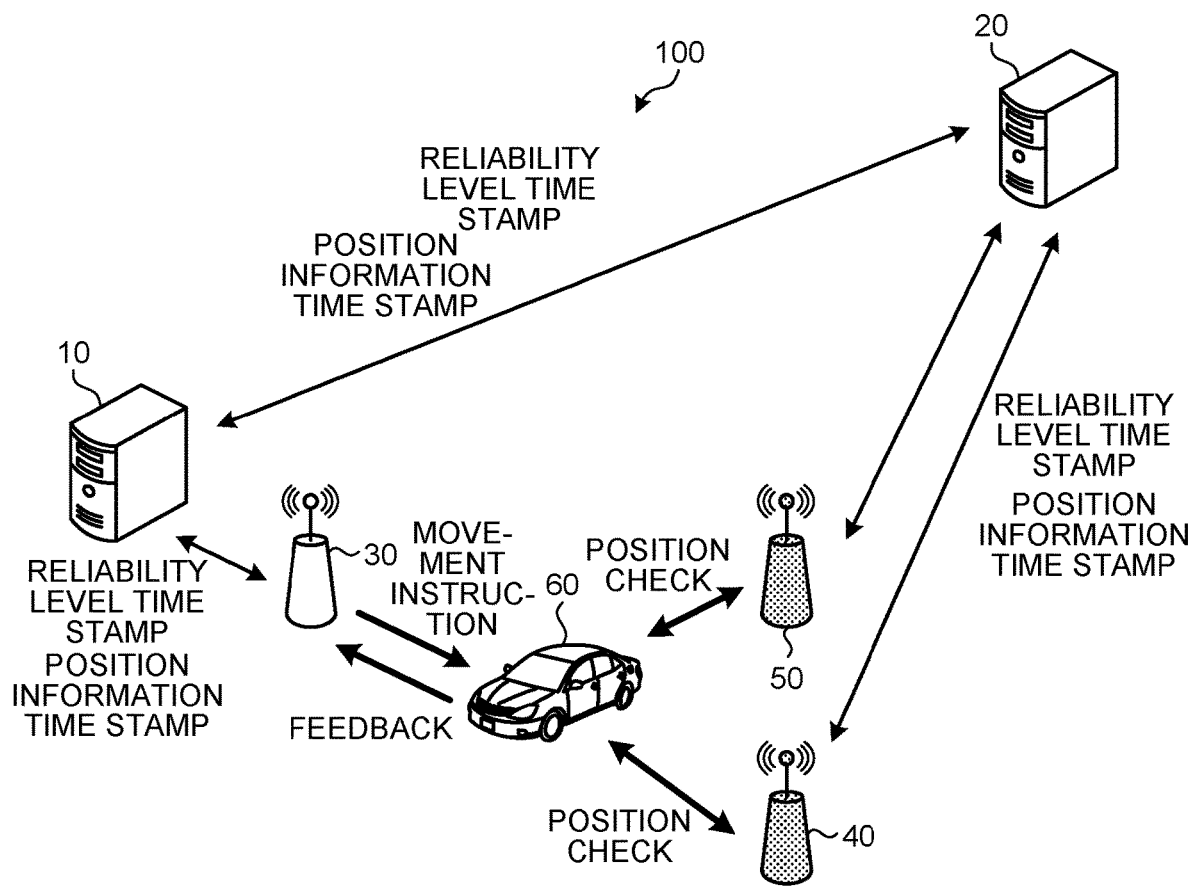
FIG. 1 is a first diagram illustrating an example of a configuration of a radio communication system according to a first embodiment.

FIG. 1 is a first diagram illustrating an example of a configuration of a radio communication system 100 according to a first embodiment. The radio communication system 100 includes position management servers 10 and 20, a base station 30, sidelink stations 40 and 50, and a mobile object 60. The radio communication system 100 is a system including a first position management server that holds first position information indicating the position of the mobile object 60 measured by a first method, and a second position management server that holds second position information indicating the position of the mobile object 60 measured by a second method. In other words, the radio communication system 100 includes a plurality of position management servers that hold position information of the mobile object 60 measured by different methods from each other.

In the radio communication system 100, the position management server 10 may be the first position management server, the first method may be a positional measurement method for measuring an absolute position of the mobile object 60, the position information of the absolute position of the mobile object 60 held by the position management server 10 may be the first position information, the position management server 20 may be the second position management server, the second method may be a positional measurement method for measuring a relative position of the mobile object 60, and the position information of the relative position of the mobile object 60 held by the position management server 20 may be the second position information. Alternatively, in the radio communication system 100, the position management server 20 may be the first position management server, the first method may be a positional measurement method for measuring a relative position of the mobile object 60, the position information of the relative position of the mobile object 60 held by the position management server 20 may be the first position information, the position management server 10 may be the second position management server, the second method may be a positional measurement method for measuring an absolute position of the mobile object 60, and the position information of the absolute position of the mobile object 60 held by the position management server 10 may be the second position information. Hereinafter, an example of the former case where the position management server 10 is the first position management server and the position management server 20 is the second position management server will be described.

The base station 30 performs communication with the position management server 10 and the mobile object 60. The base station 30 measures the absolute position of the mobile object 60 on the basis of received power, the direction of a received radio wave, and the like by using a reference signal, for example. For information on the direction of a received radio wave, the number of a beam used for reception of the reference signal for positional measurement, the number of a beam used for transmission of the reference signal, or the like, may be used. The radio communication system 100 may include a plurality of base stations 30, and may perform positional measurement by transmitting reference signals for positional measurement from the base stations 30. Note that, in the radio communication system 100, the mobile object 60 may measure the absolute position of the base station 30 in a manner similar to the base station 30 described above, and notify the base station 30 of the position information.

The sidelink stations 40 and 50 manage communication information of sidelink, which is communication between devices. The sidelink stations 40 and 50 generate control signals for communication between devices, store results of measurement of relative positions performed between devices, and the like, for example.

The mobile object 60 is a communication device that moves in a communication area of the radio communication system 100. The mobile object 60 is a smartphone, mobile phone, a vehicle on which a communication terminal is mounted, an automated guided vehicle (AGV), or the like, for example, but is not limited thereto. The mobile object 60 checks the position with the sidelink stations 40 and 50.

The position management server 10 manages, that is, holds the first position information indicating the absolute position of the mobile object 60 measured by the base station 30.

The position management server 20 manages, that is, holds the second position information indicating the relative position of the mobile object 60 measured by the sidelink stations 40 and 50. Note that, in a case where the absolute position of the mobile object 60 can be computed from measurement results of measuring the relative position of the mobile object 60 by the sidelink stations 40 and 50, the position management server 20 may manage, that is, hold the absolute position of the mobile object 60 as the second position information.

In the radio communication system 100, communication from the mobile object 60 toward the base station 30 or the position management server 10 and communication from the mobile object 60 toward the sidelink stations 40 and 50 or the position management server 20 are called uplink. In addition, in the radio communication system 100, communication from the base station 30 or the position management server 10 toward the mobile object 60 and communication from the sidelink stations 40 and 50 or the position management server 20 toward the mobile object 60 are called downlink.

Figure 2:
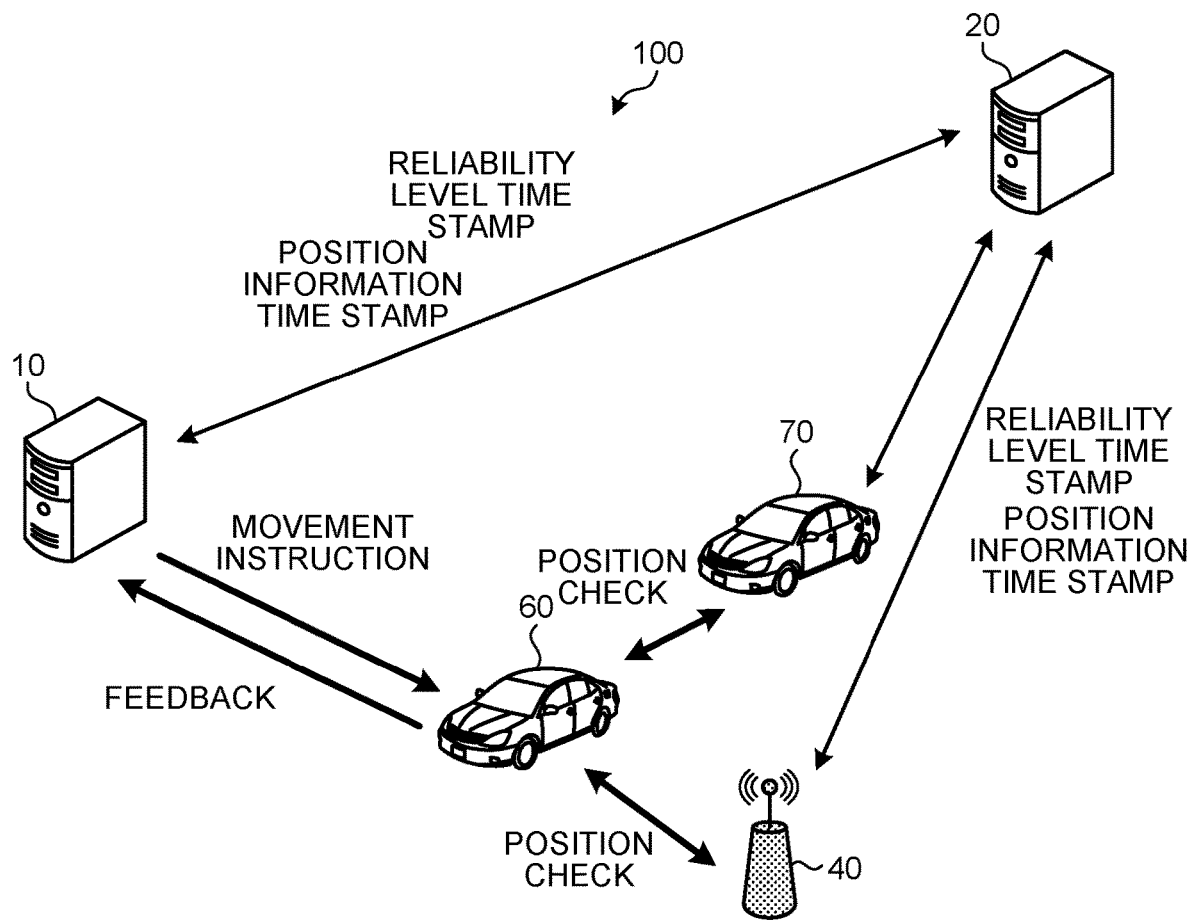
FIG. 2 is a second diagram illustrating an example of the configuration of a radio communication system according to the first embodiment.

Note that the mobile object 60 may check the position with other mobile objects instead of checking the position with the sidelink stations. Furthermore, the mobile object 60 may directly exchange information with the position management servers 10 and 20. FIG. 2 is a second diagram illustrating an example of the configuration of the radio communication system 100 according to the first embodiment. FIG. 2 illustrates an example in which position check is also performed between the mobile objects 60 and 70. FIG. 2 also illustrates an example in which the mobile object 60 directly exchanges information with the position management server 10, and the mobile object 70 directly exchanges information with the position management server 20. In the example of FIG. 2, the position management server 10, instead of the base station 30 illustrated in FIG. 1, measures the absolute positions of the mobile objects 60 and 70. The method for measuring the absolute positions of the mobile objects 60 and 70 by the position management server 10 is similar to the method for measuring the absolute positions of the mobile objects 60 and 70 by the base station 30 illustrated in FIG. 1. In addition, in the example of FIG. 2, the position management server 20 may, instead of the sidelink station 40, measure the relative positions of the mobile objects 60 and 70. The method for measuring the relative positions of the mobile objects 60 and 70 by the position management server 20 is similar to the method for measuring the relative positions of the mobile objects 60 and 70 by the sidelink stations 40 and 50 illustrated in FIG. 1. Hereinafter, an example of the radio communication system 100 illustrated in FIG. 1 will be described. While an example in which positional measurement is performed via the base station 30 can also be considered in the present embodiment, in this case, the base station 30 only transmits a reference signal in accordance with an instruction output from the position management server 10, and thus transmits a reference signal for the positional measurement.

A method of performing position check between the mobile object 60 and the sidelink stations 40 and 50 to measure the relative position of the mobile object 60 in the radio communication system 100 will be explained. For the method for measuring the relative position of the mobile object 60, a reference signal defined in 3GPP standards or the like may be used between the mobile object 60 and the sidelink stations 40 and 50, or sensors or the like installed in the mobile object 60, the sidelink stations 40 and 50, and the like may be used. An example of a signal that can be used as a reference signal in the 3GPP standards can be a demodulation reference signal (DMRS) for sidelink, but a positioning reference signal (PRS), a channel state information-reference signal (CSI-RS), a tracking reference signal (TRS), or the like may be used.

Typically, information on relative positions are exchanged between the sidelink stations 40 and 50 and the mobile object 60. The sidelink stations 40 and 50 and the mobile object 60 each transmit a reference signal, and can obtain a relative position of a communication counterpart on the basis of the reception state of a response signal in response to the reference signal. For example, the sidelink station 40 can obtain how far and in which direction the mobile object 60 is from the sidelink station 40 in units of meters or centimeters. Similarly, the sidelink station 50 can obtain how far and in which direction the mobile object 60 is from the sidelink station 50 in units of meters or centimeters. The sidelink stations 40 and 50 transmit the relative position information of the mobile object 60 to the position management server 20. For direction information, angle information, the number of a beam emitted from the sidelink station 40, the number of a beam emitted from the mobile object 60, or a received beam number used in the sidelink station 40, the mobile object 60, or the like may be used.

If the sidelink stations 40 and 50 are provided in a fixed manner and the position coordinates of the sidelink stations 40 and 50 are known, the position management server 20 can obtain the position coordinates of the mobile object 60 by using the relative position information of the sidelink stations 40 and 50 and the mobile object 60. Even in a case where the position coordinates of the sidelink stations 40 and 50 are not known, the position management server 20 may manage the position information of the mobile object 60 by using the relative position of the mobile object 60 only. The position management server 20 may manage the relative position information between the mobile object 60 and the sidelink stations 40 and 50, or may manage the absolute position of the mobile object 60.

The sidelink stations 40 and 50 and the position management server 20 exchange position information on the mobile object 60. For example, the sidelink station 40 transmits position information of the mobile object 60 measured by the sidelink station 40 to the position management server 20. The sidelink station 50 transmits position information of the mobile object 60 measured by the sidelink station 50 to the position management server 20. The position management server 20 transmits the position information of the mobile object 60 measured by the sidelink station 40 to the sidelink station 50. The position management server 20 transmits the position information of the mobile object 60 measured by the sidelink station 50 to the sidelink station 40. In the present embodiment, the sidelink stations 40 and 50 and the position management server 20 exchange reliability level time stamps and position information time stamps in the exchange of the position information.

In addition, the base station 30 and the position management server 10 exchange the position information on the mobile object 60. For example, the base station 30 transmits the position information of the mobile object 60 measured by the base station 30 to the position management server 10. In the present embodiment, the base station 30 and the position management server 10 exchange reliability level time stamps and position information time stamps in the exchange of the position information.

Figure 3:
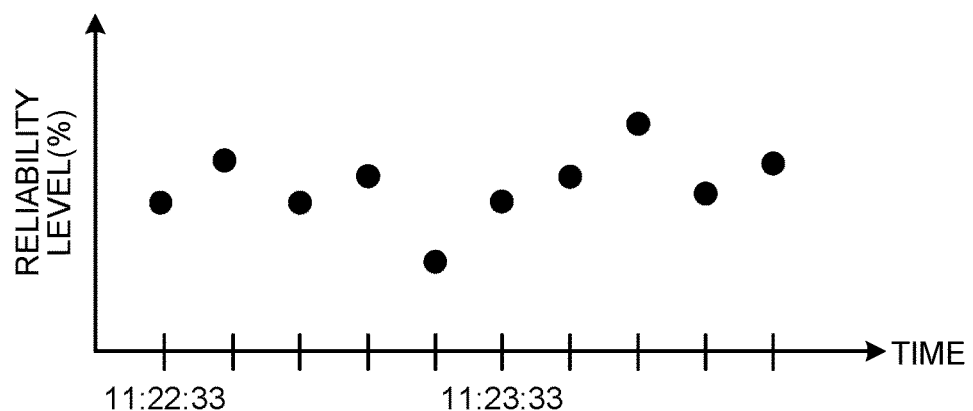
FIG. 3 is a graph illustrating an example of reliability level time stamps exchanged in the radio communication system according to the first embodiment.

FIG. 3 is a graph illustrating an example of the reliability level time stamps exchanged in the radio communication system 100 according to the first embodiment. In FIG. 3, the horizontal axis represents time, and the vertical axis represents reliability level. Note that the reliability level refers to the reliability of position information. The reliability level refers to a probability that a relative distance is within ±σ where σ represents a standard error of a result of measurement of the position of the mobile object 60, for example. The unit of σ may be the centimeter or the meter. Note that the reliability level may be represented by a probability higher than the set error or by σ. Alternatively, the reliability level may be represented by a flag of 0 or 1, or a numerical value obtained by quantization. The reliability level time stamps are data indicating the relation between the reliability level and time. The unit of time may be such unit as the second, the minute, the hour or the like, or may be a time unit specific to the system.

Figure 4:
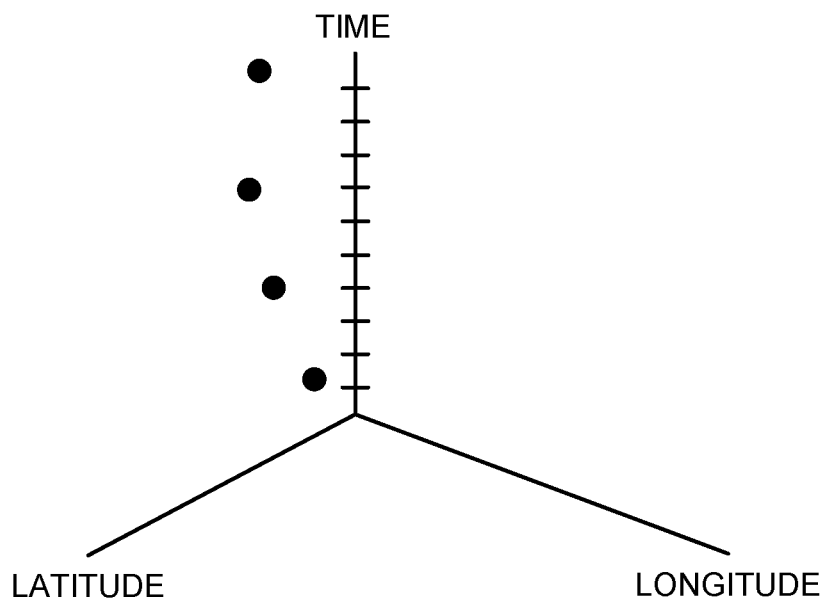
FIG. 4 is a graph illustrating an example of position information time stamps exchanged in the radio communication system according to the first embodiment.

FIG. 4 is a graph illustrating an example of position information time stamps exchanged in the radio communication system 100 according to the first embodiment. As illustrated in FIG. 4, the position information time stamps are data indicating the relation between the latitude and the longitude indicating the position of the mobile object 60 and the time of measurement of the position. Alternatively, the position information time stamps may be data indicating the relation between the relative position of the mobile object 60 and the time of measurement of the position.

Such data as the reliability level time stamps and the position information time stamps enable the radio communication system 100 to obtain the position of the mobile object 60 and the relation between the reliability level relating to the position of the mobile object 60 and time. As a result, in a case where the mobile object 60 is involved in an accident, for example, the radio communication system 100 can obtain the time when the accident occurred, the process of movement of the mobile object 60, the change of the reliability level, and the like.

Note that the reliability level time stamps may be included in reinforcement information transmitted from the position management server 10 or 20, the base station 30, the sidelink station 40 or 50, or the like. The reinforcement information is assistance information defined in the 3GPP standards, for example.

The position management server 10 can obtain the position of the mobile object 60 by periodically receiving the position information reported by the base station 30. Thus, in a state in which individual mobile objects 60 approach each other and may cause an accident in a case where a plurality of mobile objects 60 are present, when a reliability level reported with position information is low, or in like cases, the position management server 10 can transmit, for example, an instruction to stop moving to the mobile object 60 so as to prevent an accident. In addition, as illustrated in FIG. 1, the position management server 10 may transmit a movement instruction to the mobile object 60 to control the moving direction, the speed, and the like of the mobile object 60.

Figure 5:
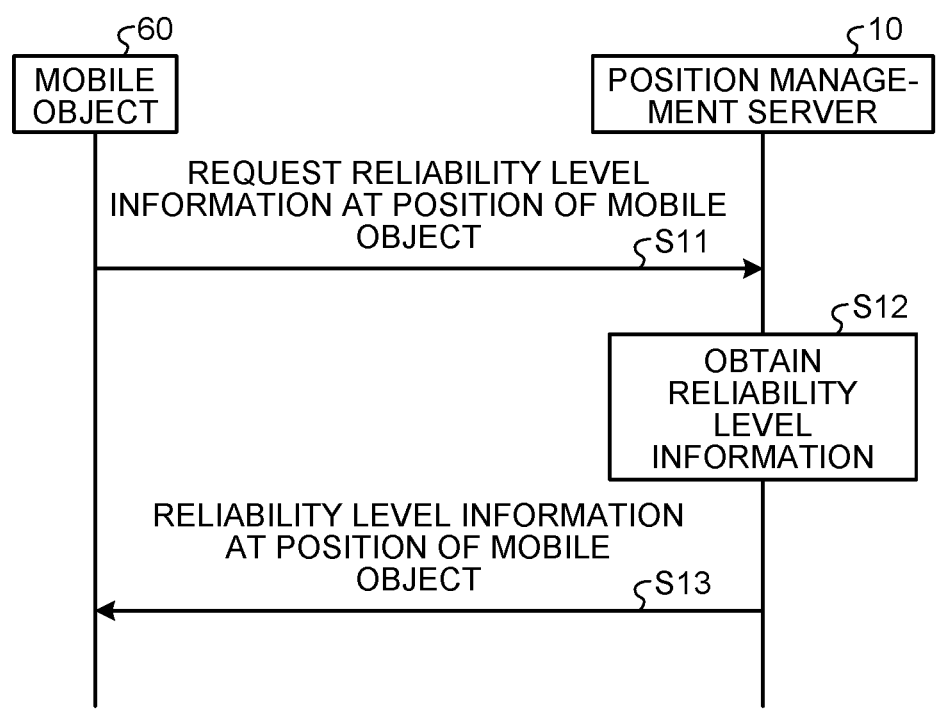
FIG. 5 is a sequence diagram illustrating operations of a mobile object for obtaining reliability level information in the radio communication system according to the first embodiment.

Note that the mobile object 60 may be enabled to request and obtain information on the reliability level at a current position of the mobile object 60. FIG. 5 is a sequence diagram illustrating operations of the mobile object 60 for obtaining reliability level information in the radio communication system 100 according to the first embodiment. The mobile object 60 requests, via the base station 30, the position management server 10 to provide reliability level information at the position of the mobile object 60 (step S11). Upon receiving the request for the reliability level information from the mobile object 60, the position management server 10 obtains the reliability level information of the mobile object 60 (step S12). In this process, when the requested reliability level information of the mobile object 60 has not been obtained from the base station 30, the position management server 10 obtains the reliability level information from the base station 30, or when the requested reliability level information has been obtained from the base station 30, the position management server 10 uses the obtained reliability level information. The position management server 10 transmits the reliability level information at the position of the mobile object 60 (step S13). In this manner, the mobile object 60 can obtain the information on the reliability level at the current position, and when the reliability level is lower than a preset value, the mobile object may perform control on stopping, the moving direction, the speed, and the like without waiting for an instruction from the position management server 10.

Note that, in the present embodiment, the position management server 10 and the position management server 20 for sidelink exchange the position information, that is, the reliability level time stamps and the position information time stamps held by the position management server 10 and the position management server 20. Specifically, the position management server 10 transmits first position information to the position management server 20. The first position information includes a reliability level time stamp indicating the reliability level at the position of the mobile object 60 and a position information time stamp indicating the position of the mobile object 60 at a timing when the position of the mobile object 60 is measured by the first method. In addition, the position management server 20 transmits second position information to the position management server 10. The second position information includes a reliability level time stamp indicating the reliability level at the position of the mobile object 60 and a position information time stamp indicating the position of the mobile object 60 at a timing when the position of the mobile object 60 is measured by the second method.

The position management server 10 thus obtains the position information from the position management server 20, which enables the position management server 10 to obtain the position of the mobile object 60 by using the position information obtained from the position management server 20 even when communication with the base station 30 and the mobile object 60 is interrupted. Similarly, the position management server 20 obtains the position information from the position management server 10, which enables the position management server 20 to obtain the position of the mobile object 60 by using the position information obtained from the position management server 10 even when communication with the sidelink stations 40 and 50 and the mobile object 60 is interrupted. Note that the position management servers 10 and 20 may exchange either one of the reliability level time stamp and the position information time stamp or may exchange information that does not include time information among the reliability level time stamp and the position information time stamp.

Figure 6:
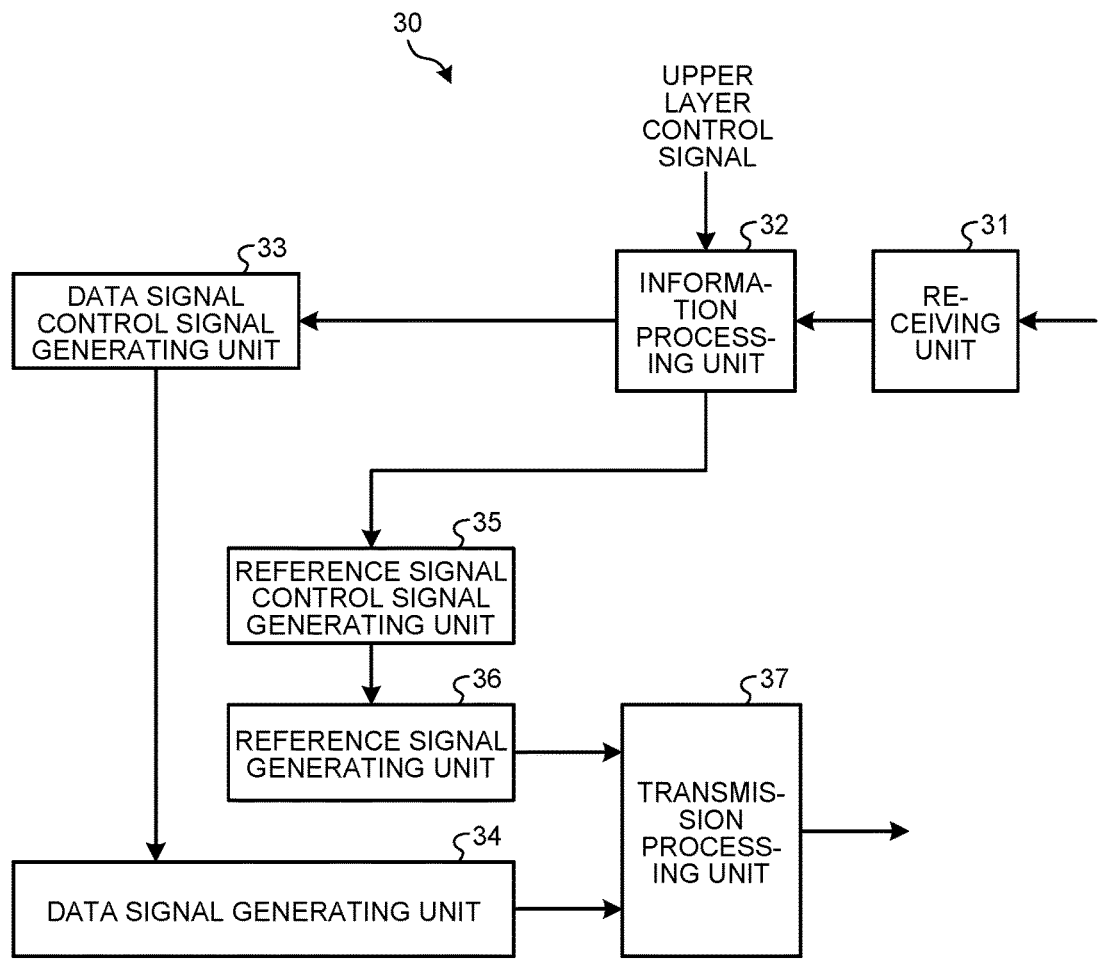
FIG. 6 is a block diagram illustrating an example of a configuration of a base station according to the first embodiment.

Next, configurations of the respective devices will be described. FIG. 6 is a block diagram illustrating an example of a configuration of the base station 30 according to the first embodiment. The base station 30 includes a receiving unit 31, an information processing unit 32, a data signal control signal generating unit 33, a data signal generating unit 34, a reference signal control signal generating unit 35, a reference signal generating unit 36, and a transmission processing unit 37.

The receiving unit 31 receives signals transmitted from the mobile object 60 or the position management server 10. The information processing unit 32 outputs instructions to the data signal control signal generating unit 33 and the reference signal control signal generating unit 35 on the basis of an output from the receiving unit 31 and a control signal, which is an instruction from an upper layer. The upper layer is a communication layer higher than a physical layer, and refers to a protocol layer, an architecture level, or the like. In the 3GPP standards, information using a protocol for positional measurement such as the radio resource control (RRC) or the LTE positioning protocol (LPP), or the like corresponds to an instruction from an upper layer, that is, a control signal. An instruction from an upper layer, that is, a control signal, may be a medium access control-control element (MAC-CE) in the 3GPP standards.

The data signal control signal generating unit 33 outputs a control signal to the data signal generating unit 34. The data signal generating unit 34 generates a data signal or a control signal to be transmitted to the mobile object 60 or the position management server 10. Upon being received by the mobile object 60, the control signal is used as a control signal for data demodulation. The control signal contains information such as a data amount, a modulation method, and a multiplexing technique. The reference signal control signal generating unit 35 outputs a control signal to the reference signal generating unit 36. The reference signal generating unit 36 generates a reference signal to be transmitted to the mobile object 60 or the position management server 10. The reference signal includes signals to be used for positional measurement, data demodulation, transmission path estimation, and the like. The transmission processing unit 37 performs transmission processing such as conversion from a digital signal to an analog signal, or digital filtering and analog filtering, on the data signal or the control signal generated by the data signal generating unit 34, the reference signal generated by the reference signal generating unit 36, and the like, and transmits the resulting signals.

In the base station 30, the information processing unit 32 may include a saving function such as a memory for saving a result of measuring the absolute position of the mobile object 60. Note that the configurations of the sidelink stations 40 and 50 are similar to that of the base station 30. In this case, information processing units of the sidelink stations 40 and 50 may each include a saving function such as a memory for saving a result of measuring the relative position of the mobile object 60.

Figure 7:
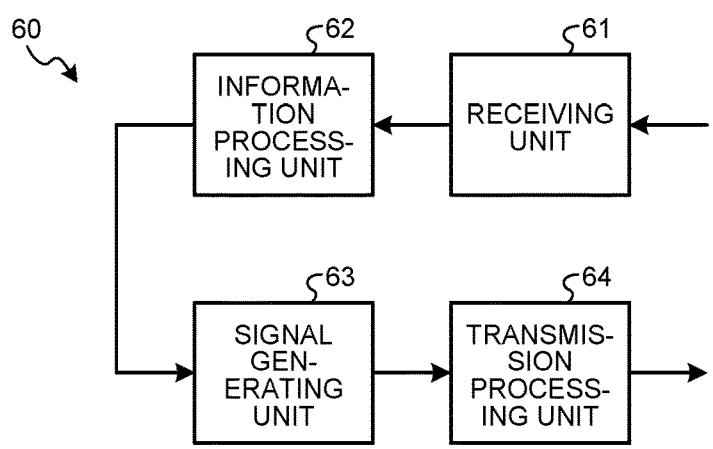
FIG. 7 is a block diagram illustrating an example of a configuration of a mobile object according to the first embodiment.

FIG. 7 is a block diagram illustrating an example of a configuration of the mobile object 60 according to the first embodiment. The mobile object 60 includes a receiving unit 61, an information processing unit 62, a signal generating unit 63, and a transmission processing unit 64. The receiving unit 61 receives signals transmitted from the base station 30, the sidelink stations 40 and 50, and the like. The receiving unit 61 may receive a reference signal transmitted from another mobile object. Received signals received by the receiving unit 61 include a reference signal for positional measurement, a control signal for data demodulation, a data signal, and the like. The information processing unit 62 outputs an instruction to the signal generating unit 63 in accordance with an output from the receiving unit 61. The signal generating unit 63 generates a data signal or a control signal to be transmitted to the base station 30 and the sidelink stations 40 and 50, and a reference signal to be transmitted to another mobile object, and the like. The transmission processing unit 64 performs transmission processing such as conversion from a digital signal to an analog signal or digital filtering and analog filtering on the data signal, the control signal, the reference signal and the like generated by the signal generating unit 63, and transmits the resulting signals. In the mobile object 60, the information processing unit 62 may include a saving function such as a memory for saving a result of measuring the absolute position or the relative position of the mobile object 60.

Figure 8:
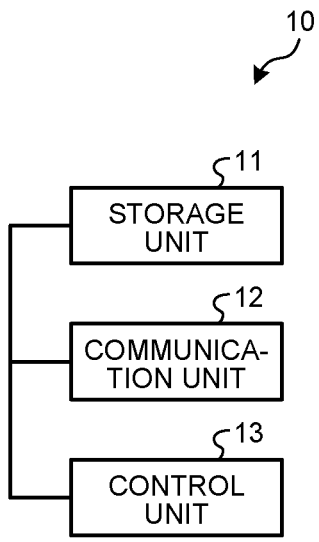
FIG. 8 is a first block diagram illustrating an example of a configuration of a position management server according to the first embodiment.

FIG. 8 is a first block diagram illustrating an example of a configuration of the position management server 10 according to the first embodiment. The position management server 10 includes a storage unit 11, a communication unit 12, and a control unit 13. The storage unit 11 holds the first position information indicating the absolute position of the mobile object 60 measured by the base station 30.

The communication unit 12 performs communication with the base station 30, the position management server 20, and the like. Specifically, the communication unit 12 receives, from the position management server 20, the second position information indicating the relative positions of the mobile object 60 measured by the sidelink stations 40 and 50, and transmits the first position information to the position management server 20. In addition, the communication unit 12 receives the first position information from the base station 30 that measures the position of the mobile object 60 by the first method, and causes the first position information to be held in the storage unit 11.

The control unit 13 generates third position information indicating the position of the mobile object 60 by using the second position information and the first position information, and causes the third position information to be held in the storage unit 11. For example, the control unit 13 compares the first position information with the second position information, obtains information that is not included in the first position information from the second position information, and incorporates the obtained information into the first position information to generate the third position information. Alternatively, the control unit 13 may compare the first position information with the second position information, obtain information that is not included in the first position information from the second position information, incorporate the obtained information into the first position information, and further adopt information with a higher reliability level for the information overlapping in the first position information and the second position information to generate the third position information.

Figure 9:
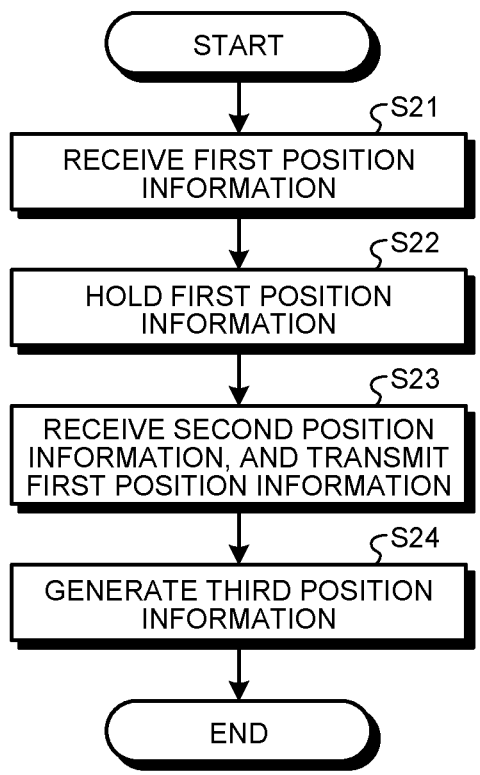
FIG. 9 is a flowchart illustrating operations of the position management server according to the first embodiment.

Operations of the position management server 10 will be explained. FIG. 9 is a flowchart illustrating the operations of the position management server 10 according to the first embodiment. In the position management server 10, the communication unit 12 receives, from the base station 30, the first position information obtained by measuring the position of the mobile object 60 (step S21), and causes the received first position information to be held in the storage unit 11. The storage unit 11 holds the first position information (step S22). The communication unit 12 receives the second position information from the position management server 20, and transmits the first position information to the position management server 20 (step S23). The control unit 13 generates the third position information indicating the position of the mobile object 60 by using the second position information and the first position information (step S24), and causes the third position information to be held in the storage unit 11.

While the configuration and the operations of the position management server 10 have been described, the configuration and the operations of the position management server 20 are similar to those of the position management server 10.

Figure 10:
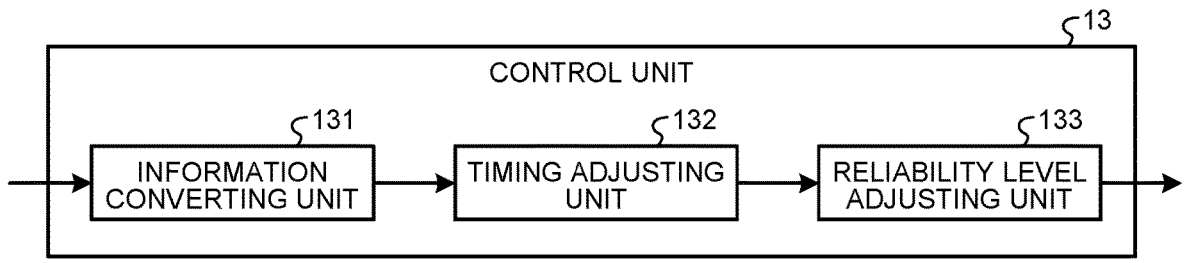
FIG. 10 is a block diagram illustrating an example of a configuration of a control unit included in the position management server according to the first embodiment.

Note that, when reliability level time stamps and position information time stamps, that is, the position information is exchanged between the position management server 10 and the position management server 20, the position information held in the position management server 10 and the position information held in the position management server 20 may be different from each other in the format, the unit of time of positional measurement, the granularity of the reliability level, and the like. In such a case, the position management servers 10 and 20 each need to convert position information obtained from the other position management server into information in a data format that can be used therein. FIG. 10 is a block diagram illustrating an example of a configuration of the control unit 13 included in the position management server 10 according to the first embodiment. The control unit 13 includes an information converting unit 131, a timing adjusting unit 132, and a reliability level adjusting unit 133.

The information converting unit 131 converts the format of the second position information into the format of the first position information. The information converting unit 131 may be an information converting device such as a positioning translator (PT) that has a configuration attachable to and removable from the position management server 10. Alternatively, in a case where the position management servers 10 and 20 manage position information in the same format, the position management server 10 may have a configuration that does not include the information converting unit 131.

The timing adjusting unit 132 makes the timing at which the position of the mobile object 60 was measured by the first method and the timing at which the position of the mobile object 60 was measured by the second method consistent with each other. Specifically, when the time stamp of the first position information and the time stamp of the second position information are different from each other in the unit of time, the timing adjusting unit 132 unifies the units of time of the time stamps of the first position information and the second position information. When the position information at a timing corresponding to the time of positional measurement of the mobile object 60 in the first position information is not included in the second position information, for example, the timing adjusting unit 132 obtains the position of the mobile object 60 at the intended timing by interpolation using the position information measured at timings before and after the intended timing included in the second position information.

The reliability level adjusting unit 133 makes the reliability level in the first position information and the reliability level in the second position information consistent with each other. Specifically, when reliability level time stamps in the first position information and reliability level time stamps in the second position information are different from each other in the granularity of reliability levels, the reliability level adjusting unit 133 unifies the granularity of the reliability levels in the first position information and the second position information. The reliability level adjusting unit 133 converts the granularity of the reliability level in the second position information into the granularity of the reliability level in the first position information, for example. The reliability levels used by the position management servers 10 and 20 may be expressed in the form of quality of service (QoS).

Note that the information converting unit 131 may have the functions of the timing adjusting unit 132 and the reliability level adjusting unit 133. While a system for maintaining compatibility of parameters of the first position information with parameters of the second position information has been explained in the example described above, the parameters of the second position information may be adjusted to maintain compatibility with the parameters of the first position information by the same configuration as that of the control unit 13.

Examples of application of the radio communication system 100 will be described. In the radio communication system 100, the position management servers 10 and 20 exchange and hold the position information of the mobile object 60 measured by different methods, which can reduce the possibility of losing track of the position of the mobile object 60. The radio communication system 100 can therefore be applied to real-time control of a mobile object 60, or the like. The radio communication system 100 can, for example, manage the operation of a mobile object 60 that moves in a factory on the basis of the relation of position information and time information indicated by time stamps of the reliability level or the like. The radio communication system 100 can correct operation time stamps of a device mounted on a mobile object 60 depending on the moving time of the mobile object 60. An example of a device mounted on a mobile object 60 is a forklift. The radio communication system 100 can manage the operation of a device in association with time stamps.

Under the control of the radio communication system 100, a mobile object 60 on which a forklift is mounted moves from a point A at time T1 and reaches a point B by time T2, for example. The mobile object 60 on which the forklift is mounted operates in a sequence of lifting a load at the point B at time T3 and moving toward the point A at time T4. The times T1, T2, T3, and T4 may be absolute times or times uniquely used in the radio communication system 100. Conventionally, devices in a factory can be operated in accordance with time information of a schedule transmitted by a factory device operation management network such as a time sensitive network (TSN). There is a possibility, however, that a device mounted on a mobile object 60 cannot operate at a specified position as scheduled owing to a delay in the time taken for movement or the like. Because the radio communication system 100 of the present embodiment can reduce the situations in which the positional measurement precision lowers in measuring the position of the mobile object 60, the radio communication system 100 can continue control on the mobile object 60 without losing track of the mobile object 60. Note that the position management server 10 may adjust time stamps of factory automation (FA) devices, such as the mobile object 60 on which the forklift is mounted, by the information converting unit 131 included in the control unit 13.

Figure 11:
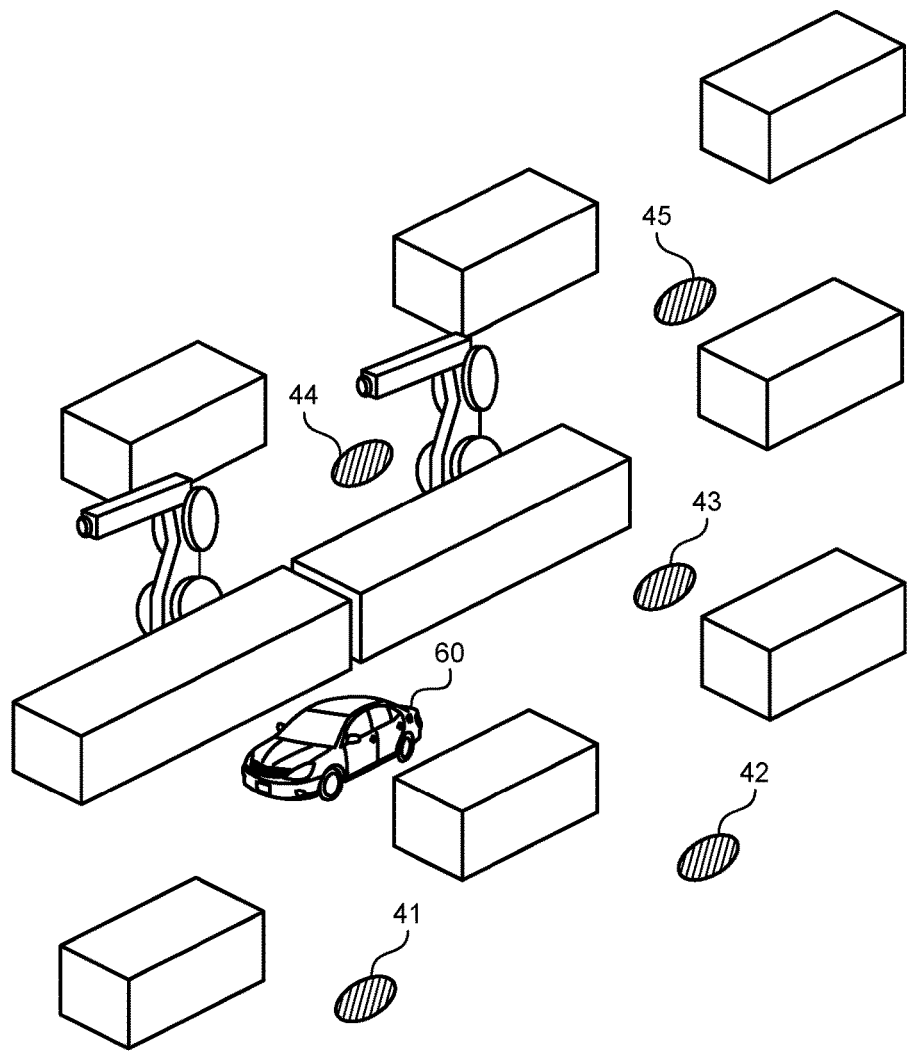
FIG. 11 is a diagram illustrating an example of arrangement of sidelink stations in the radio communication system according to the first embodiment.

Arrangement of sidelink stations in a case where the radio communication system 100 is used in a factory or the like will be explained. FIG. 11 is a diagram illustrating an example of arrangement of sidelink stations in the radio communication system 100 according to the first embodiment. In the example of FIG. 11, the radio communication system 100 includes sidelink stations 41 to 45. The sidelink stations 41 to 45 may be arranged on the ground, or may be installed under the ground as illustrated in FIG. 11. The sidelink stations 41 to 45 are used to obtain positions relative to a mobile object 60. Thus, when the sidelink stations 41 to 45 are installed at regular intervals under the ground as depicted by ellipses in FIG. 11, the radio communication system 100 can obtain the positions of the sidelink stations 41 to 45 and the mobile object 60 at regular intervals, which enables accurate measurement of the position of the mobile object 60. In addition, because the sidelink stations 41 to 45 are installed under the ground, and thus are not obstacles for the mobile object 60, the arrangement suitable for positional measurement is achieved. In addition, because the installation of the sidelink stations 41 to 45 under the ground does not affect the layout of workbenches, conveyor belts and the like installed in a factory, the arrangement is also suitable for positional measurement of a mobile object 60 in a factory.

Figure 12:
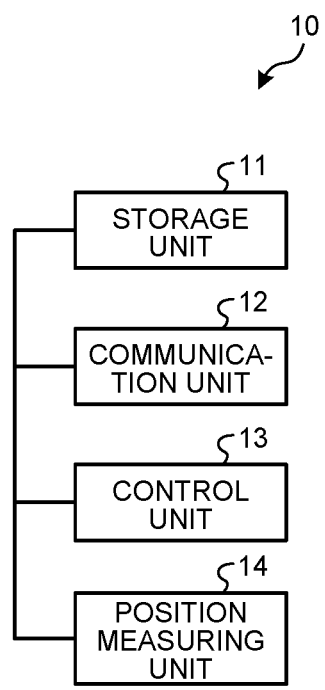
FIG. 12 is a second block diagram illustrating an example of a configuration of a position management server according to the first embodiment.

A configuration of the position management server 10 in a case where the mobile object 60 directly exchanges information with the position management server 10 as illustrated in FIG. 2 will now be described. FIG. 12 is a second block diagram illustrating an example of a configuration of the position management server 10 according to the first embodiment. The position management server 10 includes the storage unit 11, the communication unit 12, the control unit 13, and a position measuring unit 14. The position measuring unit 14 measures the position of the mobile object 60 by the first method, and causes the first position information to be held in the storage unit 11. The position measuring unit 14 has a configuration similar to that of the base station 30 illustrated in FIG. 6, and is thus capable of measuring the absolute position of the mobile object 60 by the first method.

As described above, according to the present embodiment, in the radio communication system 100, the position management servers 10 and 20 exchange, that is, share the position information of the mobile object 60 measured by different methods from each other and held by each other. As a result, even in a case where an obstacle is present between the base station 30 that measures the position of the mobile object 60 and the mobile object 60, the position management server 10 can reduce the situations in which the positional measurement precision lowers in measuring the position of the mobile object 60 and obtain the position of the mobile object 60 by using the position information from the position management server 20. In addition, even in a case where an obstacle is present between the sidelink stations 40 and 50 that measure the position of the mobile object 60 and the mobile object 60, the position management server 20 can reduce the situations in which the positional measurement precision lowers in measuring the position of the mobile object 60 and obtain the position of the mobile object 60 by using the position information from the position management server 10.

Furthermore, the position management servers 10 and 20 can improve the positional measurement precision of the absolute position of the mobile object 60 by sharing the position information to obtain the absolute position of the mobile object 60 and further using results of measurement of the relative positions performed between the mobile object 60 and the sidelink stations 40 and 50.

Second Embodiment

In the first embodiment, the radio communication system 100 measures the position of the mobile object 60 by two methods. In the second embodiment, a method for preventing the precision of measuring the position of the mobile object from lowering in a case where the position of the mobile object cannot be measured by one of the methods will be explained.

Figure 13:
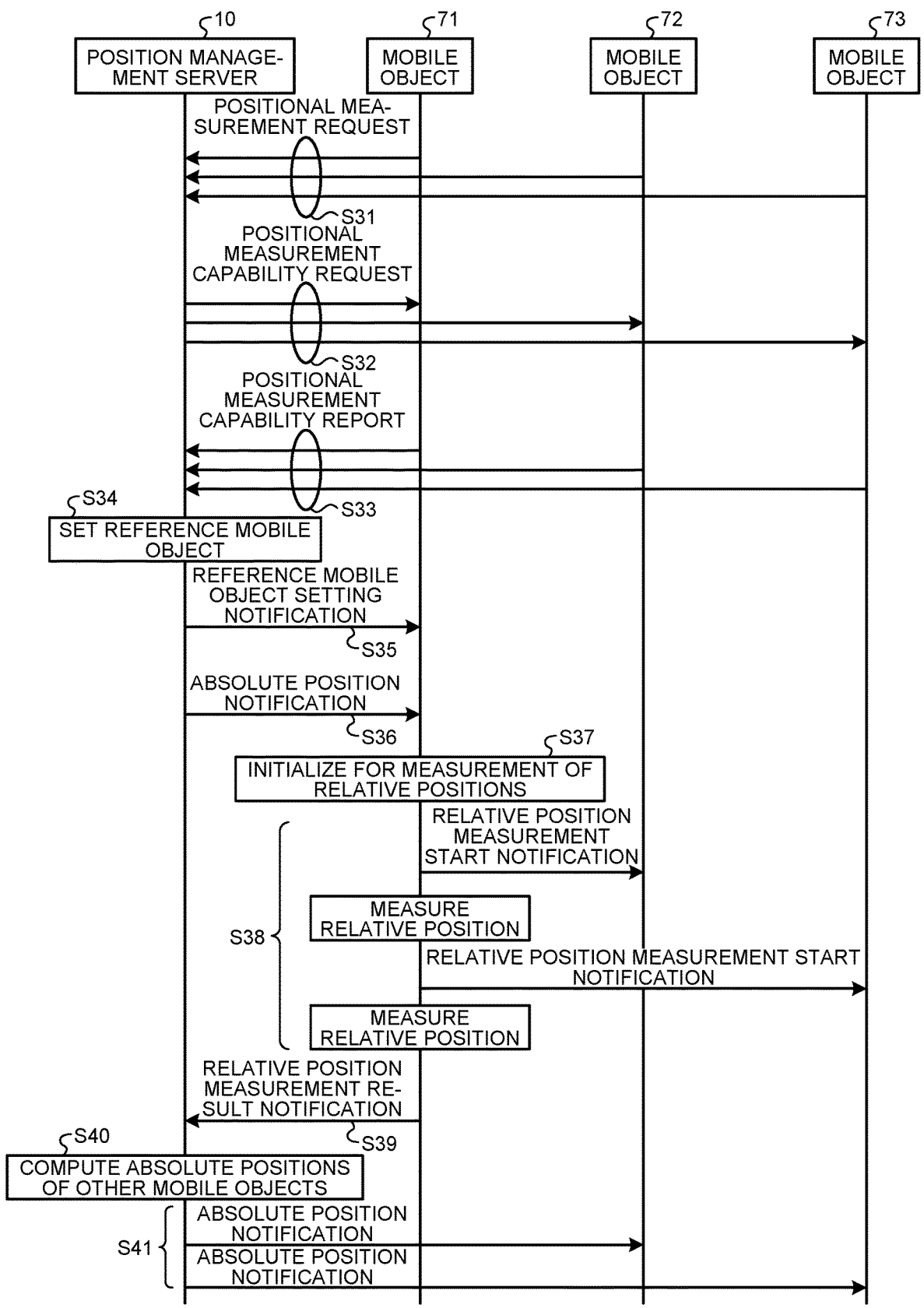
FIG. 13 is a sequence diagram illustrating operations of a position management server for measuring the positions of mobile objects in a radio communication system according to a second embodiment.
Figure 14:
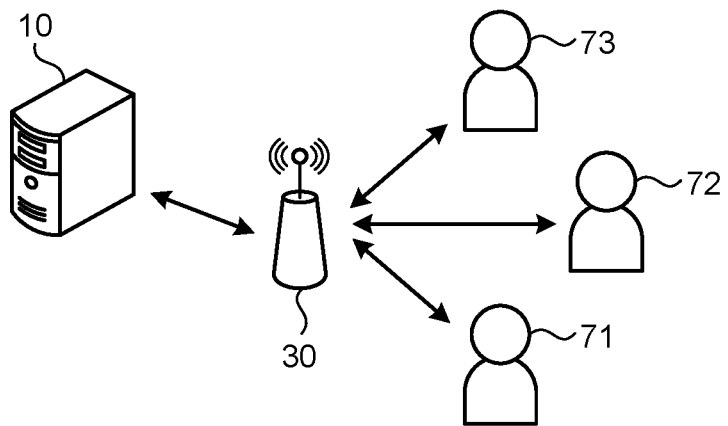
FIG. 14 is a first diagram illustrating operation states of the position management server, a base station, and the mobile objects in the radio communication system according to the second embodiment.

In the second embodiment, assume that the radio communication system 100 includes mobile objects 71 to 73 illustrated in FIGS. 13 and 14. While an example in which three mobile objects are included is used herein, the number of mobile objects is not limited in the present embodiment. In addition, assume that the mobile objects 71 to 73 each include a specific sensor, and have a positional measurement capability in measuring the relative position using a positional measurement method standardized by the Institute of Electrical and Electronics Engineers (IEEE) standards, the 3GPP standards, or the like. FIG. 13 is a sequence diagram illustrating operations of the position management server 10 for measuring the positions of the mobile objects 71 to 73 in the radio communication system 100 according to the second embodiment. Note that either of the position management servers 10 and 20 may operate, and a case where the position management server 10 operates will be described as an example.

FIG. 14 is a first diagram illustrating operation states of the position management server 10, the base station 30, and the mobile objects 71 to 73 in the radio communication system 100 according to the second embodiment. The mobile objects 71 to 73 transmit requests for positional measurement to the position management server 10 via the base station 30 (step S31). Upon receiving the requests for positional measurement, the position management server 10 requests the mobile objects 71 to 73 to report positional measurement capability via the base station 30 (step S32). The mobile objects 71 to 73 report the positional measurement capability to the position management server 10 via the base station 30 (step S33). The positional measurement capability refers to the characteristics of sensors and the like included in the mobile objects 71 to 73, results of measurement of the positions relative to the sidelink stations 40 and 50, and the like.

Figure 15:
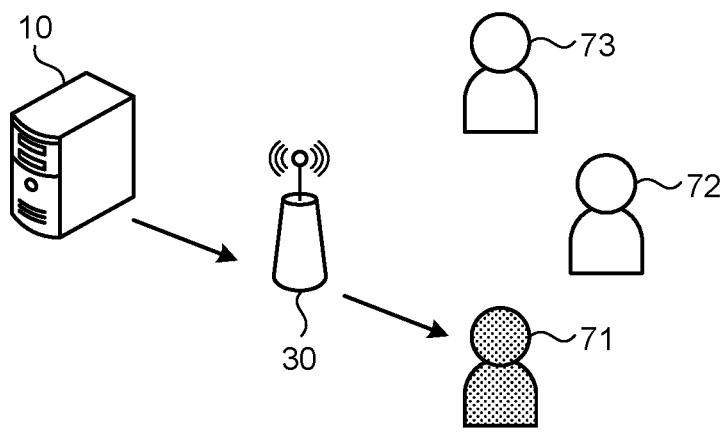
FIG. 15 is a second diagram illustrating operation states of the position management server, the base station, and the mobile objects in the radio communication system according to the second embodiment.

FIG. 15 is a second diagram illustrating operation states of the position management server 10, the base station 30, and the mobile objects 71 to 73 in the radio communication system 100 according to the second embodiment. The position management server 10 sets, as a reference mobile object, a mobile object having a high positional measurement capability in measuring the relative position (step S34). The position management server 10 deems a mobile object having a high-precision sensor to have a high positional measurement capability in measuring the relative position, and sets the mobile object as the reference mobile object, for example. In addition, the position management server 10 obtains results of measurement of the positions relative to the sidelink stations 40 and 50 from the position management server 20. Thus, the position management server 10 may compare the results of measurement of the relative positions obtained from the position management server 20 with the results of measurement of the relative positions of the mobile objects 71 to 73, and set, as the mobile object having a high positional measurement capability, a mobile object that has transmitted a result of measurement of the relative position that is closest to the result of measurement of the relative position obtained from the position management server 20. Alternatively, the position management server 10 may omit the operations in steps S31 to S33, and specify in advance a mobile object that is the reference mobile object. Herein assume that the position management server 10 sets the mobile object 71 as the reference mobile object. The position management server 10 notifies the mobile object 71 that the mobile object 71 is set as the reference mobile object via the base station 30 (step S35), and notifies the mobile object 71 of the absolute position of the mobile object 71 (step S36). The absolute position of the mobile object 71 can be measured by transmission and reception of reference signals between the base station 30 and the mobile object 71 and on the basis of observation results as in the technique explained in the first embodiment. Alternatively, the mobile object 71 may measure the absolute position by using signals from a satellite and using supplementary information from the position management server 10.

Figure 16:
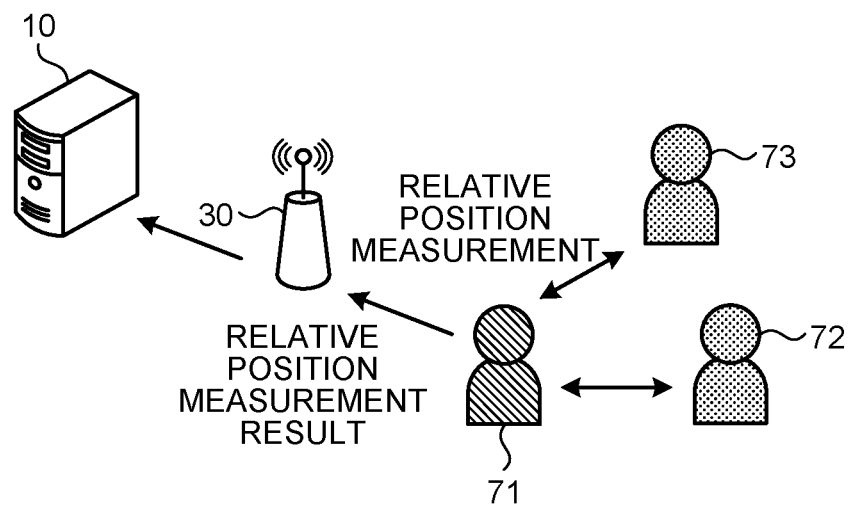
FIG. 16 is a third diagram illustrating operation states of the position management server, the base station, and the mobile objects in the radio communication system according to the second embodiment.

FIG. 16 is a third diagram illustrating operation states of the position management server 10, the base station 30, and the mobile objects 71 to 73 in the radio communication system 100 according to the second embodiment. The mobile object 71 is notified of the setting of the reference mobile object and of the absolute position by the position management server 10, and performs initialization for measurement of the relative positions (step S37). The initialization for measurement of the relative positions includes setting of the absolute position to be a reference when the mobile object 71 measures the relative positions of the mobile objects 72 and 73, and the like. The mobile object 71 notifies the mobile object 72 of start of measurement of the relative position, and performs measurement of the relative position. Similarly, the mobile object 71 notifies the mobile object 73 of start of measurement of the relative position, and performs measurement of the relative position (step S38). The mobile object 71 performs, as relative positional measurement, measurement of the distances between the mobile object 71, which is the reference mobile object, and the mobile objects 72 and 73 and the directions of the mobile objects 72 and 73. For the directions, the mobile object 71 may obtain the directions in which signals received from the mobile objects 72 and 73 have the highest received powers. The mobile object 71 may use, as information on the directions, beam numbers used to transmit the reference signals for positional measurement or beam numbers used by the mobile objects 72 and 73 to receive the reference signals transmitted from the mobile object 71. Because the mobile object 71, which is the reference mobile object, can measure the relative positions with high precision, the positions of the mobile objects 72 and 73 relative to the mobile object 71 can be obtained with high precision. The mobile object 71 reports the results of measuring the relative positions of the mobile objects 72 and 73 to the position management server 10 via the base station 30 (step S39). Note that the results of measurement of the relative positions may be reported to the position management server 10 via the base station 30 by the mobile objects 72 and 73.

Figure 17:
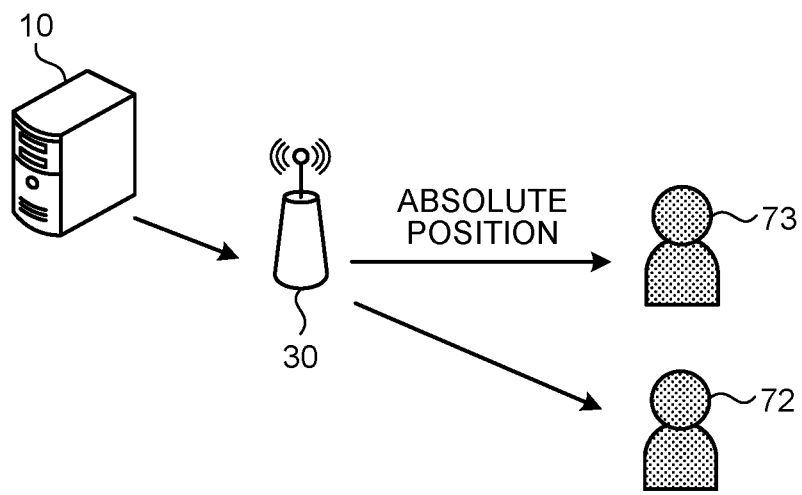
FIG. 17 is a fourth diagram illustrating operation states of the position management server, the base station, and the mobile objects in the radio communication system according to the second embodiment.

Because the position management server 10 has the absolute position of the mobile object 71, which is the reference mobile object, when the results of measurement of the relative positions of the mobile object 71 and the mobile objects 72 and 73 are obtained, the position management server 10 can compute the absolute positions of the other mobile objects 72 and 73 (step S40). The position management server 10 notifies the mobile object 72 of the absolute position of the mobile object 72 obtained by the computation via the base station 30, and notifies the mobile object 73 of the absolute position of the mobile object 73 obtained by the computation via the base station 30 (step S41). FIG. 17 is a fourth diagram illustrating operation states of the position management server 10, the base station 30, and the mobile objects 71 to 73 in the radio communication system 100 according to the second embodiment. FIG. 17 illustrates the operation states in step S41. Note that, in FIG. 17, the mobile object 71 is not illustrated.

As described above, in the case where a plurality of mobile objects 71 to 73 perform radio communication in the radio communication system 100, upon receiving requests for positional measurement from the mobile objects 71 to 73, the control unit 13 sets the mobile object 71 as the reference mobile object, which is a mobile object to be a reference, from among the mobile objects 71 to 73. The control unit 13 instructs the mobile object 71, which is the reference mobile object, to measure the relative positions of the other mobile objects 72 and 73, and notifies the mobile object 71, which is the reference mobile object, of the absolute position of the mobile object 71. The control unit 13 obtains the relative positions of the other mobile objects 72 and 73 from the mobile object 71, which is the reference mobile object, and computes the absolute positions of the mobile objects 72 and 73 by using the absolute position of the mobile object 71, which is the reference mobile object, and the relative positions of the mobile objects 72 and 73.

As described above, according to the present embodiment, the position management servers 10 and 20 can obtain the positions of the mobile objects other than the reference mobile object by combining an accurate result of measurement of the absolute position and accurate results measurement of relative positions performed by the reference mobile object. The position management servers 10 and 20 enable the base station 30 to minimize the use of resources, that is, time and frequency bands necessary for accurate measurement of absolute positions of the mobile objects 60 by setting a reference mobile object.

Next, a hardware configuration of the position management server 10 will be described. In the position management server 10, the storage unit 11, the communication unit 12, the control unit 13, and the position measuring unit 14 are implemented by processing circuitry. The processing circuitry may be constituted by a processor that executes programs stored in a memory and the memory, or may be dedicated hardware. The processing circuitry is also called a control circuit.

Figure 18:
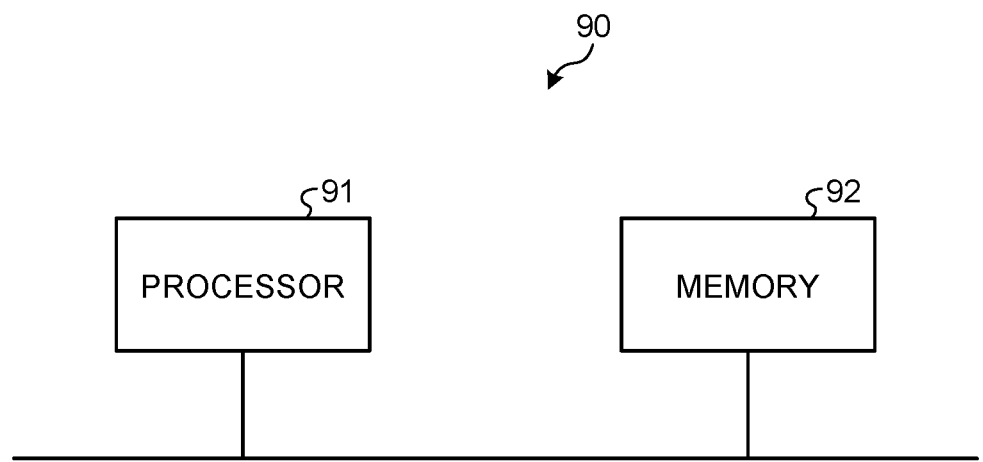
FIG. 18 is a diagram illustrating an example of a configuration of processing circuitry in a case where the processing circuitry included in a position management server according to the first and second embodiments is implemented by a processor and a memory.

FIG. 18 is a diagram illustrating an example of a configuration of processing circuitry 90 in a case where the processing circuitry included in the position management server 10 according to the first and second embodiments is implemented by a processor and a memory. The processing circuitry 90 illustrated in FIG. 18 is a control circuit including a processor 91 and a memory 92. In the case where the processing circuitry 90 is constituted by the processor 91 and the memory 92, the functions of the processing circuitry 90 are implemented by software, firmware, or a combination of software and firmware. The software or firmware is described in the form of programs and stored in the memory 92. The processing circuitry 90 implements the functions by reading and executing the programs stored in the memory 92 by the processor 91. Specifically, the processing circuitry 90 includes the memory 92 for storing programs that result in execution of processes of the position management server 10. The programs are, in other words, programs for causing the position management server 10 to perform the functions implemented by the processing circuitry 90. The programs may be provided by a storage medium storing the programs, or may be provided by other means such as a communication medium.

In other words, the programs are programs for causing the position management server 10 to execute a first step in which the storage unit 11 holds first position information, a second step in which the communication unit 12 receives second position information from the second position management server, and transmits the first position information to the second position management server, and a third step in which the control unit 13 generates third position information indicating the position of the mobile object 60 by using the second position information and the first position information, and causes the third position information to be held in the storage unit 11.

Note that the processor 91 is a central processing unit (CPU), a processing device, a computing device, a microprocessor, a microcomputer, a digital signal processor (DSP), or the like, for example. In addition, the memory 92 is a nonvolatile or volatile semiconductor memory such as a random access memory (RAM), a read only memory (ROM), a flash memory, an erasable programmable ROM (EPROM), or an electrically EPROM (EEPROM: registered trademark), a magnetic disk, a flexible disk, an optical disk, a compact disc, a mini disc, a digital versatile disc (DVD) or the like, for example.

Figure 19:
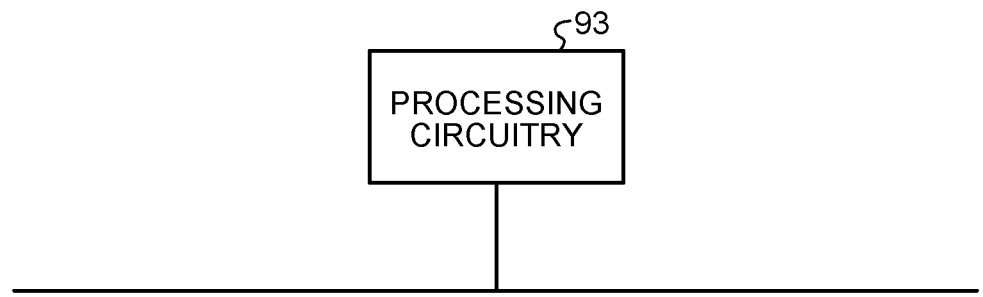
FIG. 19 is a diagram illustrating an example of processing circuitry in a case where the processing circuitry included in the position management server according to the first and second embodiments is constituted by dedicated hardware.

FIG. 19 is a diagram illustrating an example of processing circuitry 93 in a case where the processing circuitry included in the position management server 10 according to the first and second embodiments is constituted by dedicated hardware. The processing circuitry 93 illustrated in FIG. 19 is a single circuit, a composite circuit, a programmed processor, a parallel-programmed processor, an application specific integrated circuit (ASIC), a field programmable gate array (FPGA), or a combination thereof, for example. Part of the processing circuitry may be implemented by dedicated hardware, and part thereof may be implemented by software or firmware. As described above, the processing circuitry is capable of implementing the above-described functions by dedicated hardware, software, firmware, or a combination thereof.

While a hardware configuration of the position management server 10 has been described, the hardware configurations of the position management server 20, the base station 30, the sidelink stations 40 and 50, and the mobile objects 60 and 70 to 73 are similar to that of the position management server 10.

The position management server according to the present disclosure produces an effect of enabling reduction of situations in which the positional measurement precision lowers in measuring the position of a mobile object.

The configurations presented in the embodiments above are examples, and can be combined with other known technologies or with each other, or can be partly omitted or modified without departing from the gist.

What is claimed is:

1. A position management server being a first position management server in a radio communication system that includes the first position management server to hold first position information indicating a position of a mobile object measured by a first method, and a second position management server to hold second position information indicating the position of the mobile object measured by a second method, the position management server comprising:
a memory to hold the first position information;
communication circuitry to receive the second position information from the second position management server, and transmit the first position information to the second position management server, the second method using a sidelink such that the second position information indicates a relative position of the mobile object measured using the sidelink; and
control circuitry to generate third position information indicating the position of the mobile object by using the second position information and the first position information, and cause the third position information to be held in the memory, wherein
the first position information includes a reliability level time stamp indicating a reliability level at a position of the mobile object and a position information time stamp indicating the position of the mobile object at a timing of measurement of the position of the mobile object by the first method,
the second position information includes a reliability level time stamp indicating a reliability level at a position of the mobile object and a position information time stamp indicating the position of the mobile object at a timing of measurement of the position of the mobile object by the second method, and
the control circuitry includes:
timing adjusting circuitry to make a timing of measurement of the position of the mobile object by the first method and a timing of measurement of the position of the mobile object by the second method consistent with each other; and
reliability level adjusting circuitry to make a reliability level in the first position information and a reliability level in the second position information consistent with each other.

2. The position management server according to claim 1, wherein
the control circuitry includes:
an information converter to convert a format of the second position information into a format of the first position information.

3. The position management server according to claim 1, wherein
the communication circuitry receives the first position information from a base station that measures the position of the mobile object by the first method, and causes the first position information to be held in the memory.

4. The position management server according to claim 1, comprising:
position measuring circuitry to measure the position of the mobile object by the first method, and cause the first position information to be held in the memory.

5. The position management server according to claim 1, wherein
the first method is a method for measuring an absolute position of the mobile object, the second method is a method for measuring the relative position of the mobile object, and a plurality of mobile objects perform radio communication in the radio communication system,
upon receiving a request for positional measurement from each of the mobile objects, the control circuitry sets a reference mobile object being a mobile object to be a reference from among the mobile objects, instructs the reference mobile object to measure a relative position of another mobile object and notifies the reference mobile object of the absolute position of the reference mobile object, obtains a relative position of the other mobile object from the reference mobile object, and computes an absolute position of the other mobile object by using the absolute position of the reference mobile object and the relative position of the other mobile object.

6. A radio communication system comprising:
a first position management server to hold first position information indicating a position of a mobile object measured by a first method, the first position management server being the position management server according to claim 1; and
a second position management server to hold second position information indicating the position of the mobile object measured by a second method, the second method using a sidelink such that the second position information indicates a relative position of the mobile object measured using the sidelink.

7. A control circuit for controlling a position management server being a first position management server in a radio communication system that includes the first position management server to hold first position information indicating a position of a mobile object measured by a first method, and a second position management server to hold second position information indicating the position of the mobile object measured by a second method, the control circuit causing the position management server to:
hold the first position information;
receive the second position information from the second position management server, and transmit the first position information to the second position management server, the second method using a sidelink such that the second position information indicates a relative position of the mobile object measured using the sidelink; and
generate and hold third position information indicating the position of the mobile object by using the second position information and the first position information, wherein
the first position information includes a reliability level time stamp indicating a reliability level at a position of the mobile object and a position information time stamp indicating the position of the mobile object at a timing of measurement of the position of the mobile object by the first method,
the second position information includes a reliability level time stamp indicating a reliability level at a position of the mobile object and a position information time stamp indicating the position of the mobile object at a timing of measurement of the position of the mobile object by the second method, and the control circuit further causing the position management server to make a timing of measurement of the position of the mobile object by the first method and a timing of measurement of the position of the mobile object by the second method consistent with each other; and make a reliability level in the first position information and a reliability level in the second position information consistent with each other.

8. A non-transitory storage medium storing a program for controlling a position management server being a first position management server in a radio communication system that includes the first position management server to hold first position information indicating a position of a mobile object measured by a first method, and a second position management server to hold second position information indicating the position of the mobile object measured by a second method, the program causing the position management server to:

hold the first position information;

receive the second position information from the second position management server, and transmit the first position information to the second position management server, the second method using a sidelink such that the second position information indicates a relative position of the mobile object measured using the sidelink; and generate and hold third position information indicating the position of the mobile object by using the second position information and the first position information, wherein the first position information includes a reliability level time stamp indicating a reliability level at a position of the mobile object and a position information time stamp indicating the position of the mobile object at a timing of measurement of the position of the mobile object by the first method, the second position information includes a reliability level time stamp indicating a reliability level at a position of the mobile object and a position information time stamp indicating the position of the mobile object at a timing of measurement of the position of the mobile object by the second method, and the program further causing the position management server to make a timing of measurement of the position of the mobile object by the first method and a timing of measurement of the position of the mobile object by the second method consistent with each other; and make a reliability level in the first position information and a reliability level in the second position information consistent with each other.

9. A mobile object position managing method for a position management server being a first position management server in a radio communication system that includes the first position management server to hold first position information indicating a position of a mobile object measured by a first method, and a second position management server to hold second position information indicating the position of the mobile object measured by a second method, the mobile object position managing method comprising:

holding the first position information;

receiving the second position information from the second position management server, and transmitting the first position information to the second position management server, the second method using a sidelink such that the second position information indicates a relative position of the mobile object measured using the sidelink; and generating third position information indicating the position of the mobile object by using the second position information and the first position information, and holding the third position information, wherein the first position information includes a reliability level time stamp indicating a reliability level at a position of the mobile object and a position information time stamp indicating the position of the mobile object at a timing of measurement of the position of the mobile object by the first method, the second position information includes a reliability level time stamp indicating a reliability level at a position of the mobile object and a position information time stamp indicating the position of the mobile object at a timing of measurement of the position of the mobile object by the second method, and the method further comprising:

making a timing of measurement of the position of the mobile object by the first method and a timing of measurement of the position of the mobile object by the second method consistent with each other; and making a reliability level in the first position information and a reliability level in the second position information consistent with each other.

10. The position management server according to claim 1, wherein the first position management server is separate from the second position management server.

11. The position management server according to claim 1, wherein the first position management server is separate from the mobile object.

12. The position management server according to claim 1, wherein the control circuitry compares the first position information with the second position information, obtains information that is not included in the first position information from the second position information, and incorporates the obtained information into the first position information to generate the third position information.

* * * * *